(12) United States Patent
Koenigsberg et al.

(10) Patent No.: US 10,816,568 B2
(45) Date of Patent: Oct. 27, 2020

(54) CLOSED LOOP ACCELEROMETER

(71) Applicant: PHYSICAL LOGIC LTD., Petah Tikva (IL)

(72) Inventors: Lisa Koenigsberg, Bet Shemesh (IL); Boris Grinberg, Rishon Le Zion (IL); Aviram Feingold, Shimshit (IL); Roza Wolfson, Tel-Aviv (IL)

(73) Assignee: PHYSICAL LOGIC LTD., Petah Tikva (IL)

( * ) Notice: Subject to any disclaimer, the term of this patent is extended or adjusted under 35 U.S.C. 154(b) by 393 days.

(21) Appl. No.: 15/854,008

(22) Filed: Dec. 26, 2017

(65) Prior Publication Data

US 2019/0195909 A1 Jun. 27, 2019

(51) Int. Cl.
*G01P 15/125* (2006.01)
*G01P 15/13* (2006.01)

(52) U.S. Cl.
CPC .......... *G01P 15/125* (2013.01); *G01P 15/131* (2013.01)

(58) Field of Classification Search
CPC ...... G01P 15/125; G01P 15/13; G01P 15/131; G01P 15/18
See application file for complete search history.

(56) References Cited

U.S. PATENT DOCUMENTS

| | | | |
|---|---|---|---|
| 5,205,171 A | 4/1993 | O'Brien | |
| 5,504,032 A | 4/1996 | Gessner | |
| 5,850,042 A | 12/1998 | Warren | |
| 6,105,427 A | 8/2000 | Stewart | |
| 6,167,757 B1 | 1/2001 | Yazdi | |
| 6,294,400 B1 | 9/2001 | Stewart | |
| 6,308,569 B1 | 10/2001 | Stewart | |
| 6,897,538 B2 | 5/2005 | Eskridge | |
| 6,991,957 B2 | 1/2006 | Eskridge | |
| 7,562,573 B2 | 7/2009 | Yazdi | |
| 7,578,189 B1 | 8/2009 | Mehregany | |
| 7,610,809 B2 | 11/2009 | McNeil | |
| 7,617,729 B2 | 11/2009 | Axelrod et al. | |
| 7,997,136 B2 | 8/2011 | Dwyer | |

(Continued)

OTHER PUBLICATIONS

Boris Grinberg, Aviram Feingold, Leonid Furman, Roza Wolfson, "High precision open-loop and closed-loop MEMS accelerometers with wide sensing range", Position Location and Navigation Symposium (PLANS) 2016 IEEE/ION, pp. 924-931, 2016, ISSN 2153-3598 (8 pages).

(Continued)

*Primary Examiner* — Herbert K Roberts
(74) *Attorney, Agent, or Firm* — Roach, Brown, McCarthy & Gruber, P.C.; Kevin D. McCarthy (57) ABSTRACT

A micro-mechanical electrical systems (MEMS) type accelerometer for measuring vibration and movement employs a closed loop measurement mode. The accelerometer comprises at least one capacitive section configured as a sensing section and at least one capacitive section configured as an actuator section. In embodiments of the accelerometer capacitor plates are arranged in a bilateral structure in both the sensing and actuator sections. This structure combined with the capacitive feedback provided by the closed loop operation and other features of the device allow for a much larger sensing range in addition to other advantages over presently available MEMS accelerometers.

12 Claims, 7 Drawing Sheets

(56) References Cited

U.S. PATENT DOCUMENTS

| | | | |
|---|---|---|---|
| 8,122,767 | B2 | 2/2012 | Dwyer |
| 8,136,400 | B2 | 3/2012 | Axelrod |
| 8,307,710 | B2 | 11/2012 | Dwyer |
| 8,365,596 | B2 | 2/2013 | Dwyer |
| 9,046,547 | B2 | 6/2015 | Westberg et al. |
| 9,229,026 | B2 | 1/2016 | Stewart |
| 9,383,384 | B2 | 7/2016 | Henrickson |
| 9,709,596 | B2 | 7/2017 | Geiger et al. |
| 2002/0189355 | A1 | 12/2002 | Leonardson |
| 2005/0268719 | A1 | 12/2005 | Malametz |
| 2007/0193355 | A1* | 8/2007 | Axelrod ............... G01P 15/125 73/14.32 |
| 2008/0314147 | A1* | 12/2008 | Nasiri ................. G01P 15/125 73/514.32 |
| 2009/0140356 | A1* | 6/2009 | Yazdi ................. B81C 1/00253 257/415 |
| 2010/0132466 | A1 | 6/2010 | Spahlinger |
| 2011/0005317 | A1 | 1/2011 | Dwyer |
| 2014/0260618 | A1 | 9/2014 | Ocak |
| 2016/0069928 | A1 | 3/2016 | Geiger |
| 2016/0202366 | A1 | 7/2016 | Ocak et al. |
| 2017/0089947 | A1 | 3/2017 | Townsend et al. |

OTHER PUBLICATIONS

B. Grinberg, A. Feingold, L. Koenigsberg, L. Furman, "Closed-loop MEMS accelerometer: From design to production", Inertial Sensors and Systems (ISS) 2016 DGON, pp. 1-16, 2016, ISSN 2377-3480 (16 pages).

Boris Grinberg, Aviram Feingold, "In-plane Bulk-Micromachining fabrication of high dynamic range tactical grade open loop and closed loop MEMS accelerometers", Sensors 2015, IEEE (4 pages).

S. Gonseth et al., "Breakthrough in High-end MEMS Accelerometers", Symposium Gyro Technology. 2010 (13 pages).

P. Zwahlen, Y. Dong, A-M. Nguyen, F. Rudolf, J-M. Stauffer, P. Ullah, V. Ragot, "Breakthrough in High Performance Inertial Navigation Grade Sigma-Delta MEMS Accelerometer"; IEEE/ION Plans 2012 Conference in Myrtle Beach, SC, Apr. 24-26, 2012 (5 pages).

Chao Wang, Kevin T. C. Chai, Vladimir Suplin, David Nuttman, Minkyu Je, "Reconfigurable Closed-Loop Digital ΔΣ Capacitive MEMS Accelerometer for Wide Dynamic Range, High Linearity Applications", IJIEE, vol. 3, No. 1, Jan. 2013 (5 pages).

* cited by examiner

CLOSED LOOP ACCELEROMETER

FIELD OF THE INVENTION

The present invention relates to micro-mechanical electrical systems (MEMS) type devices for measuring vibration and movement. More particularly the invention relates to a MEMS accelerometer that employs a closed loop measurement mode.

BACKGROUND OF THE INVENTION

Herein the term "closed loop accelerometer sensor" refers to a system that is partially comprised of separate sensing and actuator structures.

MEMS type devices for use as sensors and accelerometers are well known. Such devices are generally fabricated on a silicon or related planar substrate by semi-conductor manufacturing type methods, such as the use of photoresists, masks and various etching processes to fabricate a proximity sensor that includes a suspended proof mass and electronic circuit to measure the deflection of the suspended proof mass. Such devices have inherent limitations on the minimum size, detection limit, sensitivity, sensing range and the like, largely due to the structure of the MEMS, the electronic circuit used for detecting the deflection of the proof mass, and the mode of operation of the sensor.

MEMS accelerometers are used in a vast array of commercial, industrial, and military applications. For the most demanding applications, a versatile sensor is required that can measure a large range of input profiles from very small accelerations, i.e. have a low minimum detection limit at the micro-g level, to high accelerations on the order of 30-200 g.

Important aspects of performance have been compromised as attempts have been made using the technology available prior to the present invention to miniaturize accelerometer devices for diverse applications.

In particular, it has been difficult for the prior art devices to achieve a combination of features, particularly low minimum detection limit and high sensing range that can be manufactured reliably so as to minimize cost. Other critical disadvantages are large size, high power consumption, low bandwidth, high vibration rectification error, and low linearity.

U.S. Pat. No. 7,617,729 to the applicant of the present invention offers several improvements in the technology that was available at the time. These improvements include:

Structure that allows for reduced damping, thereby requiring a smaller proof mass, facilitating reduced size.

Structure that allows for optimization of sensitivity, thereby facilitating reduced minimum detection limit, and linearity. These improved parameters thereby facilitate improved performance under high acceleration inputs and highly dynamic, i.e. changing, acceleration inputs.

Centrosymmetric structure that allows for a full bridge capacitive electrical sensing circuit, which in combination facilitates reduced minimum detection limit by cancelling first order manufacturing defects and temperature sensitivities The use of double sided silicon on insulator (SOI) processing techniques that form the handle layer for the proof mass. By moving the proof mass to the handle layer, there is more area on the device layer available for the sensing structure.

Together these improvements over the prior art achieves greater sensitivity due to both larger mass and higher capacitive sensitivity.

In the invention disclosed in U.S. Pat. No. 7,617,729, electrical and mechanical schemes and structures are disclosed that allow for sensing the displacement of the suspended proof mass with respect to the substrate; thereby providing a measurement of the acceleration and direction thereof. Although many advantages over the existing prior art were provided by this invention, the dynamic range of the device is inherently defined and limited.

One way of increasing the sensing range is by changing the properties of the proof mass or the spring constant, however, this will result in an inherent increase of the minimum detection limit.

In prior art descriptions of closed loop accelerometers, e.g. as disclosed in U.S. Pat. Nos. 9,046,547 and 9,709,596, the same electrode structures are used for both sensing the displacements of the proof mass with respect to the substrate and for providing the feedback force to null the displacement. The two inventions in these two publications are quite different as U.S. Pat. No. 9,046,547 discloses an invention based on an out-of-plane design, whereas U.S. Pat. No. 9,709,596 discloses and invention based on an in-plane design.

Out-of-plane in a MEMS device refers to a sensor whose effective sensitive axis is perpendicular to the substrate of the device, whereas in an in-plane device the effective sensitive axis is parallel to the substrate of the device.

In US 2016/0202366 the advantage of separate electrode structures in closed loop accelerometers is addressed, namely the ability to apply continuous force feedback which offers a higher sensing range, higher bandwidth, and simplification of design. However the invention disclosed in US 2016/0202366 is specific to the out-of-plane MEMS design.

The feature of separate electrode structures for the sensing and actuator functions is more easily realized in an in-plane device. The structures being substantially similar will allow for much better control of critical dimensions in the SOI process since optimizing the process parameters to prevent lithography and etch loading effects is done on the whole composite structure in a unified manner.

In U.S. Pat. No. 9,046,547, an embodiment of an out-of-plane accelerometer design is proposed with multiple feedback paths to reduce noise due to residual mass motion resulting from nonlinearity of the actuator electrodes.

In US 2017/0089947, the importance of separating the sense and actuator functions in either time or frequency domain is addressed, however, there is no separation of electrode structures for the separate functions.

It is therefore a first object of the present invention to provide an accelerometer with a combination of reduced minimum detection limit and high sensing range in addition to maximum bandwidth.

It is another object of the present invention to provide an accelerometer having reduced minimum detection limit, high sensing range, and maximum bandwidth with a higher sensitivity and linearity than are available in prior art accelerometers.

It is another object of the present invention to provide the aforementioned benefits in an accelerometer that can be easily fabricated using standard silicon on insulator (SOI) fabrication techniques generally known in the semiconductor industry.

It is another object of the present invention to combine multiple accelerometers in a configuration for the simultaneous measurement acceleration either in three dimensions, for sensor fusion to improve system performance, or for redundancy.

Further purposes and advantages of this invention will appear as the description proceeds.

SUMMARY OF THE INVENTION

The first object the present invention is achieved by incorporating separate sensing and actuator sections in the accelerometer MEMS structure allowing for measurement of acceleration in a closed loop mode. More specifically, in the present invention, the sensor is a composite structure composed of at least one sensing structure and at least one actuator structure. In closed loop mode the open loop mode response functions as the input to a loop filter, either analog or digital. These sections are necessarily mechanically coupled to each other and electronically isolated from each other. In this invention they are additionally substantially similar to each other in order to offer several advantages that will be described in the coming sections.

In particular, in the present invention, the sensing and actuator MEMS structures are mechanically coupled by a substantially planar substrate a proof mass frame supported on the substrate by a plurality of planar spring elements. In both sensing and actuator structures, one or more capacitive plates is attached to and distributed with the proof mass frame while two or more arrays of capacitive plates are supported on the substrate in a cooperative inter-digitated comb like orientation. The capacitive plates are arranged with respect to the proof mass frame such that the movement of the frames permitted by the planar spring causes a change in both the gap between the stationary and moving electrodes and the overlap area between stationary and moving electrodes.

For both sensing and actuator structures the capacitive plates in a first array are arrayed in such that capacitive plates disposed on opposite sides of the plates are connected to opposite poles of a power supply to form a differential circuit for eliminating noise. This pertains separately to both the sensing and actuator sections with isolated power supplies between them.

For both sensing and actuator structures the capacitive plates of a second array are connected to opposite poles of a power supply that are separately and remotely inter-digitated with the capacitive plates in the first array to facilitate fabricating a MEMS device with electrical isolation between each of the arrays connected to opposite poles of the power supply.

For both sensing and actuator structures the arrays of capacitive plates are arranged in a bilateral scheme as disclosed in U.S. Pat. No. 7,617,729 and as is described therein for enabling a full bridge differential capacitive circuit. This arrangement further reduces noise as compared to the half bridge aspect.

The bilateral arrangement of capacitive plates pertains separately to both the sensing and actuator sections with isolated power supplies between them. This enables two separate fully differential circuits for each section.

The accelerometers of the present invention can be manufactured by processing the SOI wafer from two sides, which, amongst other advantages, results in increased mass of the suspended proof mass. This facilitates increasing the capacitive sensitivity and decreases the thermo-dynamical noise. This pertains to both the sensing and actuator sections. Preferably, these sections are processed on the same chip simultaneously during the same process. This can be achieved due to the substantially similar structure of the sensing and actuator sections. Substantially similar in this context refers to the critical dimensions of the MEMS structure for bulk SOI process optimization. The advantages of high capacitive sensitivity are separate and complementary for the sensing and actuator sections which will become more apparent in the following description. The invention is a composite structure that in composed of at least one sensing section and at least one actuator section that are connected mechanically.

In a first aspect the invention is a closed circuit accelerometer comprised of a composite structure. The composite structure comprises at least one capacitive section configured as a sensing structure and at least one capacitive section configured as an actuator structure. The composite structure is comprised of a common proof mass and a single set of springs and is manufactured as an in-plane silicon micromechanical electrical systems (MEMS) device. The capacitive sections are connected together mechanically and isolated electrically. The accelerometer comprises electronic circuits that provide a full bridge differential capacitive circuit to both the sensing section and the actuator section thereby enabling closed loop operation by using capacitance due to displacement of a proof mass in the sensing section to determine an electrostatic force that is applied by sending a voltage to the actuator section to nullify the displacement of the proof mass in the sensing section.

In embodiments of the accelerometer the capacitive sections are substantially similar in terms of critical dimensions for bulk silicon on insulator (SOI) processing.

In embodiments of the accelerometer the functions of the sensor and actuator capacitive sections can be interchanged during operation.

In embodiments of the accelerometer each of the capacitive sections comprises:

a) a planar substrate;
b) a pair of capacitive plates that extend upwards from and are supported by and are attached to the substrate, wherein the two capacitive plates are electrically isolated from each other and from the substrate, thereby creating first and second electrical nodes; and
c) four capacitive plates that are suspended above the substrate from a proof mass frame, wherein two of the capacitive plates are electrically shorted, creating a third electrical node, and the other two capacitive plates are electrically shorted, creating a fourth electrical node, and both the third and the fourth electrical nodes are electrically isolated from the proof mass frame.

In these embodiments of the accelerometer the two capacitive plates attached to the substrate together with the four capacitive plates suspended from the proof mass frame form four capacitors. Each of the four capacitors is comprised of one of the proof mass capacitive plates and a part of one of the substrate capacitive plates. The proof mass frames of all capacitive sections are mechanically connected together to form a single proof mass frame, which, together with the capacitive plates suspended from it, comprises a common proof mass. A set of planar springs, which supports the common proof mass above the substrate and confines the movement of the single proof mass frame in one dimension such that, as the proof mass frame moves or vibrates above the substrate, the capacitance of the four capacitors changes as a result of area change and gap change features of the capacitors.

In embodiments of the accelerometer each of the capacitive sections comprises:

a) a planar substrate;
b) a plurality of capacitive plates that extend bilaterally from a plurality of support arms, which extend upwards from and are supported by and are attached to the substrate; and
c) a plurality of capacitive plates that extend bilaterally from a plurality of support arms, which are attached to a proof mass frame.

In these embodiments the support arms attached to the substrate and the support arms which are attached to the proof mass frame are configured such that their respective attached capacitive plates are disposed centro-symmetrically about the geometric center of the MEMS device and interlaced with each other, thereby forming very dense electrodes. The proof mass frames of all capacitive sections are mechanically connected together to form a single proof mass frame, which, together with the capacitive plates suspended from it, comprises a common proof mass. A set of planar springs supports the common proof mass above the substrate and confines the movement of the single proof mass frame in one dimension such that, as the proof mass frame moves or vibrates above the substrate, the capacitance of the capacitors formed from the interlaced capacitor plates changes as a result of area change and gap change features of the capacitors.

Embodiments of the accelerometer comprise three capacitive sections that are mechanically connected to each other and electrically isolated from each other. The common proof mass frame is confined by the single set of springs to move parallel to the plane of the substrate in one dimension and the capacitive sections function in one of the following ways:

a) sections one and three function as actuator structures and section two functions as a sensing structure;
b) sections one and three function as sensing structures and section two functions as an actuator structure;
c) sections one and two function as actuator structures and section three functions as a sensor structure;
d) sections one and two function as sensing structures and section three functions as an actuator structure;
e) sections two and three function as actuator structures and section one functions as a sensing structure; and
f) sections two and three function as sensing structures and section one functions as an actuator structure.

In embodiments of the accelerometer the functionalities of the different sections can be changed in a time-multiplexed fashion in order to measure and compensate for non-idealities of the device.

In embodiments of the accelerometer two capacitive sections are mechanically connected to each other and electrically isolated from each other. A common proof mass frame is confined by the springs to move parallel to the plane of the substrate in one dimension and the capacitive sections function in one of the following ways:

a) section one functions as an actuator structure and section two functions as a sensing structure; and
b) section one functions as a sensing structure and section two functions as an actuator structure.

In these embodiments of the accelerometer the functionalities of the different sections can be changed in a time-multiplexed fashion in order to measure and compensate for non-idealities of the device.

In a second aspect the invention comprises an accelerometer comprised of a combination of at least two accelerometers according to the first aspect of the invention that are configured to enable simultaneous measurement of acceleration in two or three dimensions, or for sensor fusion to improve system performance, or for redundancy.

In a third aspect the invention is an actuator structure for use in a micro-mechanical electrical systems (MEMS) accelerator. The actuator structure comprises a capacitive section comprised of:

a) a planar substrate;
b) a plurality of capacitive plates that extend bilaterally from a plurality of support arms, which extend upwards from and are supported by and are attached to the substrate; and
c) a plurality of capacitive plates that extend bilaterally from a plurality of support arms, which are attached to a proof mass frame.

In this structure the support arms attached to the substrate and the support arms which are attached to the proof mass frame are configured such that their respective attached capacitive plates are disposed centro-symmetrically about the geometric center of the MEMS device and interlaced with each other, thereby forming very dense electrodes.

All the above and other characteristics and advantages of the invention will be further understood through the following illustrative and non-limitative description of embodiments thereof, with reference to the appended drawings.

DETAILED DESCRIPTION OF EMBODIMENTS OF THE INVENTION

The present invention is a MEMS accelerometer working in closed loop mode. The accelerometer comprises separate capacitive sections for the sensor and actuator functions and includes all of the advantages of an in-plane design. The particular structures for the sensing and actuator sections are optimized for critical manufacturing and performance features that are specific for an in-plane Silicon MEMS accelerometer, using full bridge differential capacitive sensing. Capacitive sensing sensitivity is optimized by the MEMS structure which includes features such as handle layer proof mass and area and gap variable structures. High capacitive sensing is a critical feature of both the sensing and actuator sections.

Embodiments of the present invention are MEMS accelerometers that use the sensor structure disclosed in U.S. Pat. No. 7,617,729 to provide the sensing function and the actuator function as part of a closed loop system. The sensed capacitance due to the displacement of the proof mass is used to calculate an electrostatic force used to nullify the displacement. This electrostatic force is applied by sending a voltage to the actuator of the system, which necessarily is mechanically connected to the proof mass of the sensing section. In this way the displacement is substantially nullified leading to improved linearity and cross sensitivities. The acceleration measurement is directly read from the voltage that provides the rebalance electrostatic force.

In this closed loop scheme, the sensing range is determined by the actuator's mechanical and electrical design. In particular, a high feedback voltage will greatly increase the sensing range and the same centrosymmetric design used for the sensing function also allows for a full bridge capacitive electrical actuator circuit. This scheme has the property of providing a higher sensing range than that provided by prior art accelerometers. The separate and similar sensing section can then be optimized for minimum detection limit. Together these features provide for much increased dynamic range required for versatile accelerometers.

The present invention is based on an in-plane design whose advantages include addressing the issue of nonlinearity of the actuator electrodes by allowing for optimizing the area and gap capacitive effects for highly improved linearity and high capacitive sensitivity to increase the sensing range. In addition, the in-plane design allows for the high linearity of the sense capacitive section which greatly improves the cross axis sensitivity and the vibration rectification errors.

Referring now to the figures, wherein like reference numerals refer to like components in the various views, a core of the present invention is a unit, indicated by 100 of the figures. Unit 100 is used as a part of an accelerometer, functioning either as a proof mass displacement sensor, or as an actuator for applying a rebalance force. When the units are mechanically connected to form a composite structure for an accelerometer, parts of the units are shared or are common as will be illustrated in the coming figures. The operative principle will first be illustrated with reference to FIGS. 1A to 1C, which schematically represent a minimum structure of the unit 100.

Figure 1A:
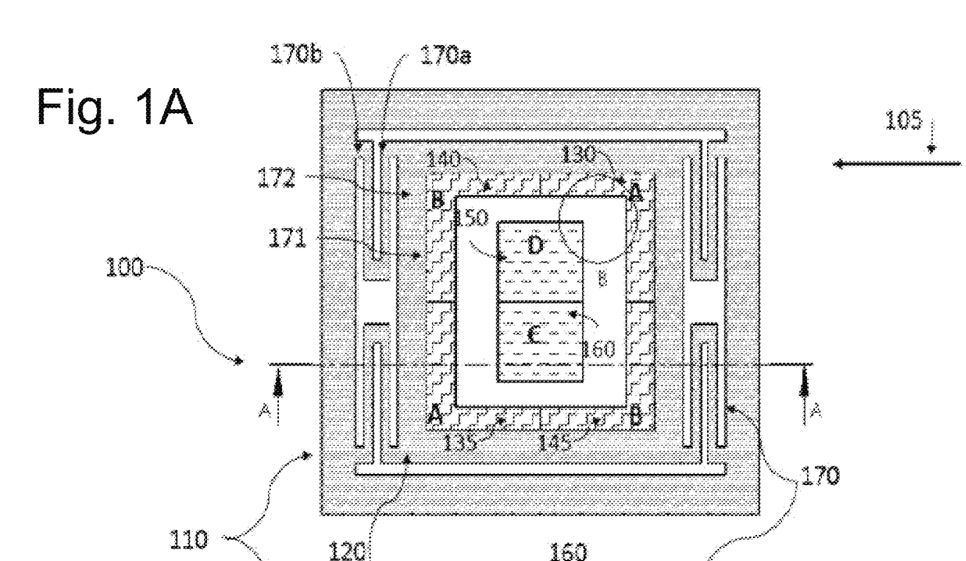
FIG. 1A is a schematic illustration showing a planar view of a unit having a minimum structure used to perform either a sensing or actuator function according to the present invention.
Figure 1B:
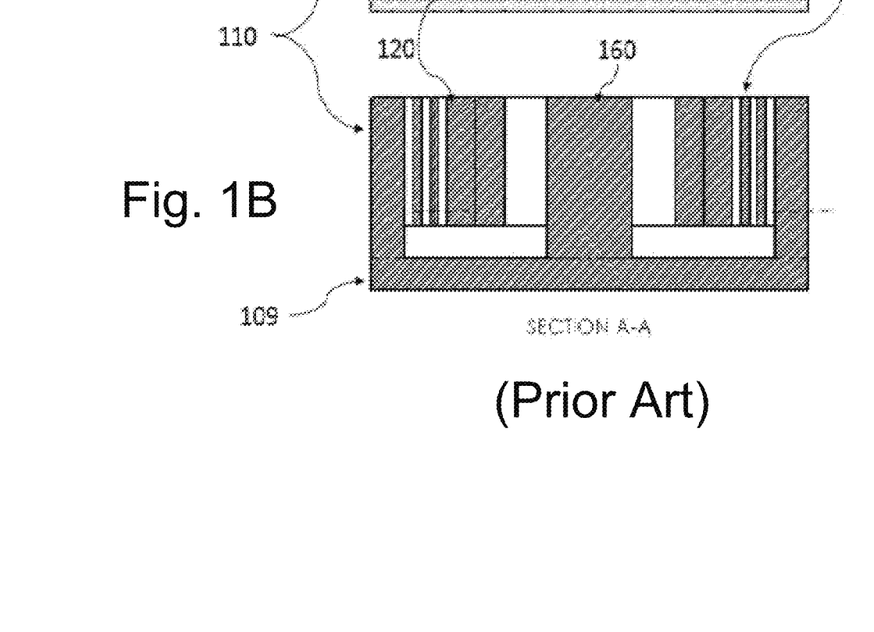
FIG. 1B is a schematic illustration showing a side view projection of the unit of FIG. 1A.
Figure 1C:
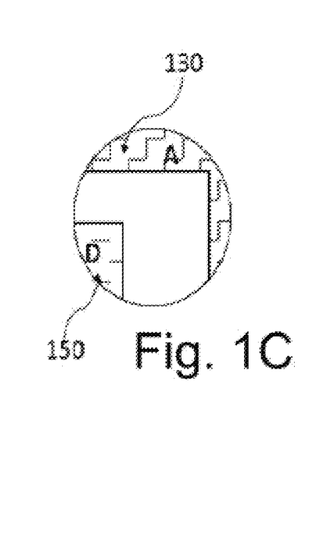
FIG. 1C is a schematic illustration showing a portion of a capacitor formed from a substrate capacitive plate and a proof mass capacitive plate in the unit of FIG. 1.
Figure 2A:
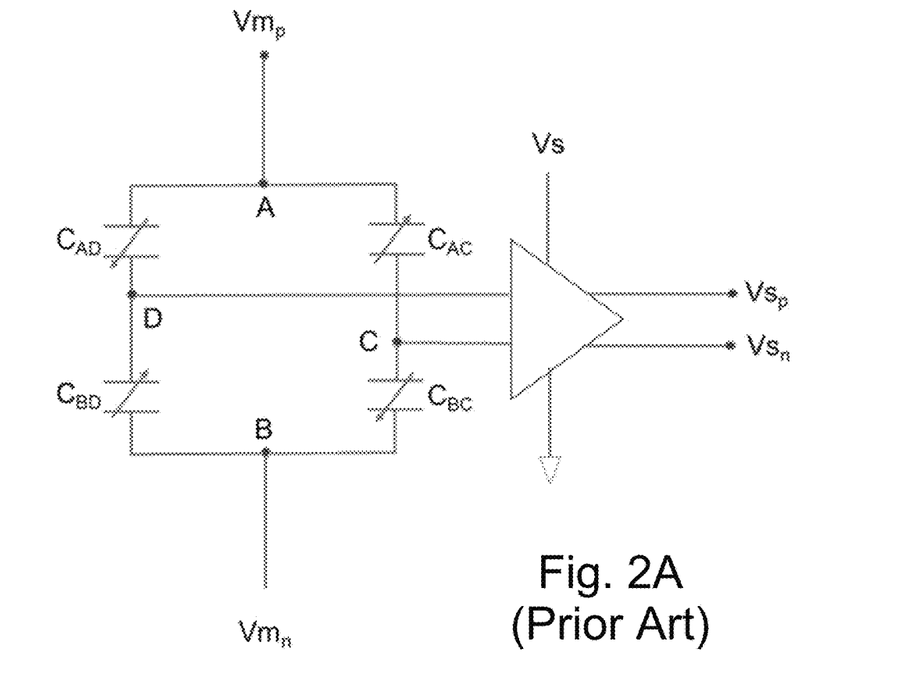
FIG. 2A is a schematic electrical diagram pertaining to the unit of FIGS. 1A to 1C operating as a sensor showing a fully differential capacitive bridge comprising four capacitors formed from capacitive plates in the unit.

The concept illustrated in FIGS. 1A to 1C was disclosed in previously referred to U.S. Pat. No. 7,617,729; however here it is more explicitly described. FIG. 1A illustrates a planar view of unit 100 that includes a frame 110, and a pair of capacitive plates 150 and 160. In FIG. 1B, it is shown that the pair of capacitive plates 150 and 160 extends upwards from substrate 109. Frame 110 and substrate 109 are electrically and mechanically connected. The capacitive plates can be connected to the substrate in alternative configurations, provided that in general they are disposed orthogonally to the plane of the substrate. Generally, capacitive plates 150 and 160 are electrically isolated from each other and from the substrate 109, creating electrical nodes C and D, as illustrated in FIG. 2A. The mechanical connection of the plates 150 and 160 to the substrate 109 is best understood with respect to FIG. 1B, which is a side view projection of unit 100.

Capacitive plates 130, 135, 140 and 145 are suspended above the substrate 109 by a proof mass frame 120. Generally, capacitive plates 130 and 135 are electrically shorted, creating electrical node A, as illustrated in FIG. 2A. Similarly, capacitive plates 140 and 145 are electrically shorted, creating electrical node B, as illustrated in FIG. 2A. Electrical nodes A and B are electrically isolated from the proof mass frame 120.

The proof mass frame 120 is attached to and supported above substrate 109 by planar springs. The planar spring 170 is preferably a leaf spring having multiple junctions with a plurality of planar segments that lie perpendicular to the substrate 109. Preferably as shown, four planar leaf springs 170 are distributed at corners of the proof mass frame 120, being coupled thereto at junctions 170a. The opposite end 170b of each leaf spring 170 is connected to the outer frame 110. Alternatively opposite end 170b can be connected to a post that extends downward to connect with the substrate 109. Thus, each of the parallel or straight segments 172 of each leaf spring is free to move due to flexure at the interconnecting folds or joints 171. Arrow 105 shows the positive direction of movement of the proof mass frame 120 as permitted by planar springs 170.

The substrate capacitive plates 150 and 160 together with the proof mass capacitive plates 130, 135, 140 and 145 form four capacitors one of which is illustrated in FIG. 1C, such that each capacitor is comprised of a proof mass capacitive plate and a part of a substrate capacitive plate 150 and 160. The planar springs 170 confine the movement of proof mass frame 120 to the direction of arrow 105 such that as the proof mass frame moves or vibrates above the substrate, the capacitance of the four capacitors changes. The change in the capacitance of the capacitors due to proof mass displacement in the positive direction of the arrow 105 is shown by arrows in FIG. 2A. Each of the four capacitors combines area change and gap change features due the proof mass displacement relative to the substrate. The present invention uses the technology disclosed in U.S. Pat. No. 7,617,729, allowing for all of the advantages due to the combination of area and gap change. The present invention applies this concept to both the sensing structure of the sensor as well as to the actuator structure.

FIG. 2A is an electrical diagram pertaining to the unit of FIGS. 1A-1C operating as a sensor. The four electrodes or nodes A, B, C, and D, described in FIGS. 1A to 1C from a mechanical perspective are now shown from an electrical perspective connected so as to form a fully differential capacitive bridge. The arrows in the capacitors represent the direction of change in capacitance as a function of displacement of the proof mass. For example, if there is displacement of the proof mass in the positive direction according to arrow 105 of FIG. 1A, the capacitance of capacitors $C_{AD}$ and $C_{BC}$ will be reduced and the capacitance of capacitors $C_{AC}$ and $C_{BD}$ will be increased. This full bridge circuit in combination with the centrosymmetric layout described below has the advantage of canceling offsets stemming from strains and manufacturing errors and some other first order effects on the device, such as temperature, stress and like variations. In one possible topology that is common for capacitive sensing, the sense section is modulated by two antiphase voltage signals, $Vm_p$, and $Vm_n$, in a fully differential capacitive bridge comprised of two differential capacitive dividers. The constant reference sense voltage Vs drives the differential amplifier that outputs two sense voltage signals $Vs_p$ and $Vs_n$ that are then subtracted from each other to get a fully differential signal of the sense capacitors. This method improves interference rejection with higher CMRR (common-mode rejection ratio) and PSRR (power supply rejection ratio). The combination of the above descriptions of FIGS. 1A, 1B, 1C and FIG. 2A illustrates both the mechanical and electrical advantages of this aspect of the invention.

Figure 2B:
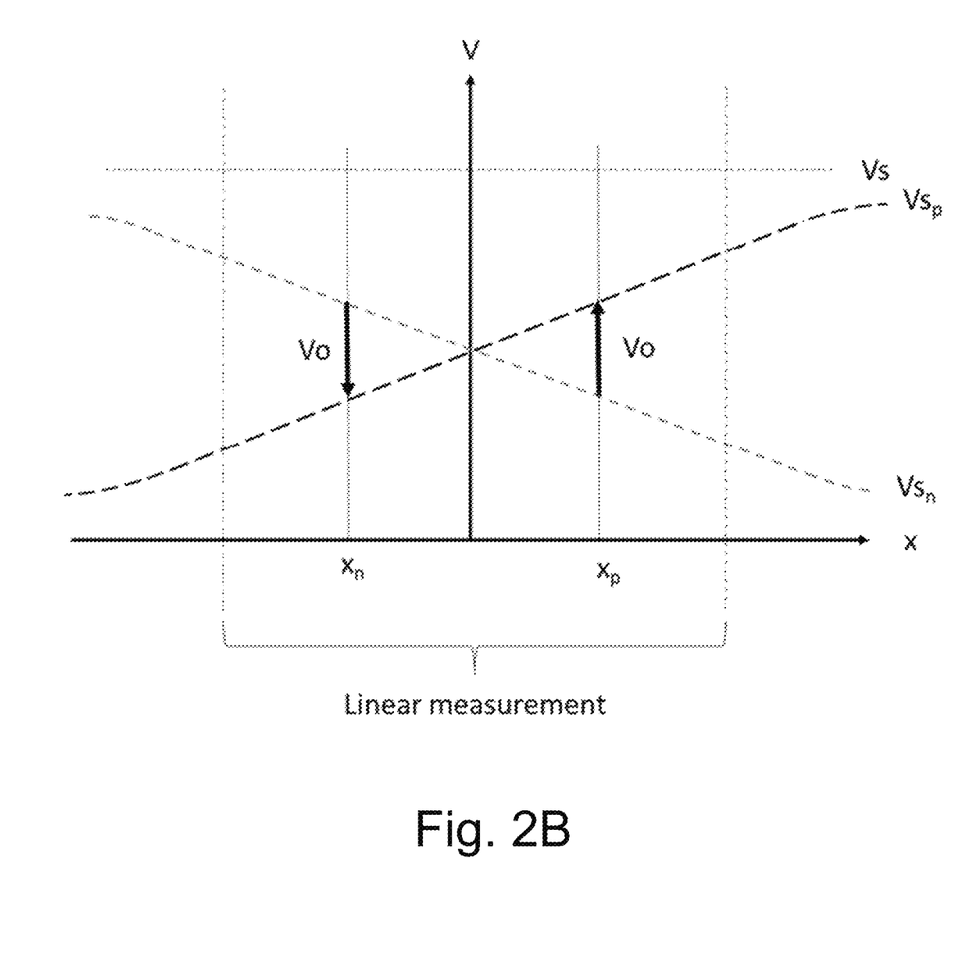
FIG. 2B is a schematic illustration demonstrating the differential Voltage sensing output response of the sensor described in FIG. 1A and FIG. 2A operating in open loop mode.

FIG. 2B is a schematic demonstrating the differential voltage sensing output response of the sensor described in FIG. 1A and FIG. 2A operating in open loop mode. The graphs show in general voltage V as a function of mechanical displacement x of the MEMS structure. In particular, the sense voltage signals, $Vs_p$ and $Vs_n$, are plotted as a function of mechanical displacement. In a typical implementation these signals are subtracted from each other, for example the differential signal, $Vo=Vs_p-Vs_n$, is used as the signal representing the mechanical displacement when operating in open loop mode. FIG. 2B also illustrates that positive mechanical displacement, Xp is distinguished from negative mechanical displacement, Xn, derived from the polarity of the differential signal.

In the present invention, the sensor is a composite structure composed of at least one sensing structure and at least on actuator structure. In closed loop mode the open loop mode response functions as the input to a loop filter, either analog or digital. In closed loop mode, under steady state conditions, i.e. after transient response of closing the loop, the loop filter calculates the force applied to a mechanically connected actuator section in order to nullify the linear measurement of the composite structure and in turn to nullify the differential voltage. The acceleration information, i.e. measurement, appears as the feedback force applied to the actuator in order to nullify the differential voltage.

Figure 3:
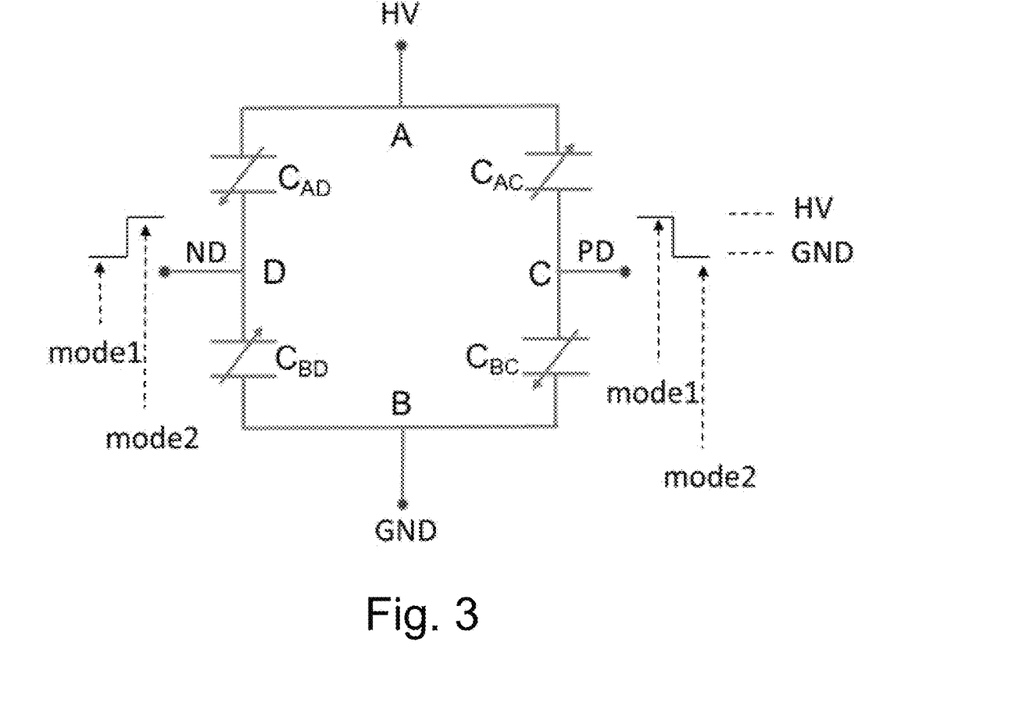
FIG. 3 is a schematic electrical diagram pertaining to the unit of FIGS. 1A to 1C operating as an actuator showing the actuation function of the unit and acceleration measurement in closed loop mode.

FIG. 3 is a schematic electrical diagram pertaining to the unit of FIGS. 1A to 1C operating as an actuator. FIG. 3 demonstrates the actuation function and acceleration measurement. The mechanical description of the actuator section is similar to that of the sensing section as described in FIGS. 1A to 1C. As can be seen by comparing FIG. 3 with FIG. 2A, the electrical schematic of the sensing and actuator sections are both full bridge capacitive electrical circuits. The distinguishing feature between them is only how the four nodes A, B, C, and D are connected. For the actuator function, node A is connected to a constant high voltage source. This high voltage is one of the factors that determine the maximum feedback force that can be applied to the actuator, which directly determines the maximum acceleration that can be measured by the sensor or the closed loop sensing range of the sensor. The B node is connected to ground. A high frequency pulse density modulation signal, in this case the feedback signal, is then applied to the remaining nodes, C and D, which contains the acceleration signal and is directly calculated from the loop filter output in the closed loop mode. Node C receives the positive drive, PD, signal and Node D receives the inverse of the PD signal, i.e. the negative drive signal, ND. In this way the full bridge topology is used to apply an electrostatic feedback force to the MEMS structure.

In FIG. 3 two time frames of the feedback signal are shown, delineated as mode 1 and mode 2. In one embodiment of the feedback scheme, that is common for force feedback MEMS, pulse density modulation is applied by sending one of two possible modes to the MEMS at any given time frame. For example, typically, mode 1 would be the voltage that corresponds to the positive maximum force that can be applied and mode 2 would be the voltage that corresponds to the negative maximum force that can be applied. Since these time frames are quite small as compared to the response time of the mechanical transfer function of the MEMS, the MEMS responds only to the average of the pulses, or in other words to the pulse density. In general for the two time frames shown in FIG. 3, each time frame could be either at mode 1 or mode 2, depending on the acceleration and the dynamics and noise of the closed loop system. In FIG. 3, the particular case is shown in which the first time frame is mode 1 and the second time frame is mode 2. The measurement acceleration signal in the closed loop mode is then proportional to the modulation signal after filtering out the high frequency modulation components.

The substantially similar mechanical and electrical design of the sensing and actuator sections affords several advantages. Substantially similar in this context refers to the critical dimensions of the MEMS structure for bulk SOI process optimization as well as the electrical schematic. One advantage is that the SOI process of the two sections is now identical and can be optimized in a unified manner. Another advantage is that each section can be used as either a sensing section or an actuator section. A composite structure contains at least one sensing section and at least one actuator section. By interchanging the functions of the two sections in a time-multiplexed manner, inherent non-idealities of the composite structure can be detected as measurement errors. These errors can then be compensated for.

Figure 4:
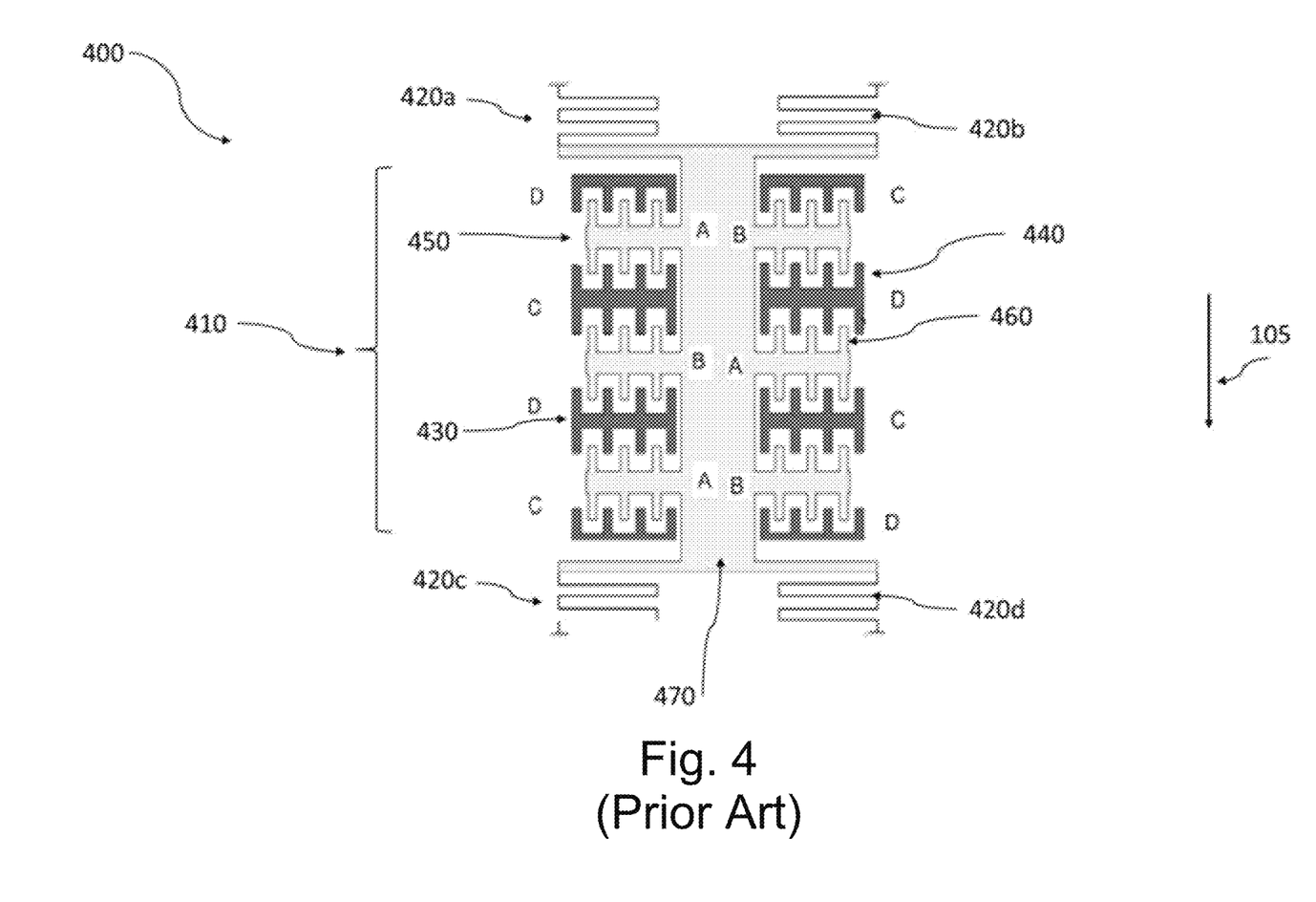
FIG. 4 is a schematic illustration of the function elements of the unit in FIGS. 1A to 1C that correspond to the electrical diagrams of FIGS. 2 and 3 to illustrate a practical concept of realizing this invention.

FIG. 4 is a schematic illustration of the functional elements of the unit in FIGS. 1A to 1C that correspond to the electrical diagrams of FIGS. 2 and 3. FIG. 4 illustrates a practical concept of realizing the present invention. The concept illustrated in FIG. 4 was previously disclosed in U.S. Pat. No. 7,617,729; however here it is more explicitly described in relation to the present invention. The device 400 in FIG. 4 contains a capacitive section 410 and spring sections 420. Arrow 105 shows the positive direction of movement of the proof mass 470 as permitted by planar springs 420.

The capacitive section 410 can function as either a sense section or an actuator section as part of a closed loop sensor. FIG. 4 illustrates the details of the design to optimize performance, but is not intended to disclose a particular scale or size.

A plurality of capacitive plates 440 in device 400 of FIG. 4 extend bilaterally from a plurality of support arms 430, which extend upwards from and are supported by and are attached to the substrate, and a plurality of capacitive plates 460 extend bilaterally from a plurality of support arms 450, which are attached to proof mass 470. The main elements of the previous descriptions so far apply here as well, particularly to mechanical capacitive sensing via both area change and gap change as well as to the electrical connections to form a full bridge circuit. The area change effect provides a more linear measurement whereas the gap change effect is a more sensitive measurement. The combination of the two effects allows for optimizing the balance between linearity and sensitivity to obtain a sensor design that has advantages in many performance parameters.

It is to be noted that the bilateral structure for the actuator, which is unique to the present invention allows for a much larger sensing range than that obtained with prior art mems accelerometers that use capacitive feed back.

First, it can be appreciated that the arrangement of static support arms 430 the attached capacitive plates 440, the dynamic support arms 450 which extend out from the proof mass 470, and their attached capacitive plates 460 are disposed centro-symmetrically about the geometric center of the MEMS device. In combination with a full bridge electrical arrangement this has an advantage of canceling offsets stemming from strains and manufacturing errors and some other first order effects on the device, such as temperature, stress and like variations. In particular this structure is free from the first order effects of large parasitic capacitance. This configuration enables the full bridge circuit and in addition it increases the capacitive area and reduces damping from air resistance. The structural organization of isolating the bulk of the proof mass 470 below the interlaced capacitive plates 440 and 460 permits a very dense electrode, i.e. a greatly enhanced capacitive sensitivity.

The enhanced capacitive sensitivity for the sense section gives enhanced performance for measuring small signals. These performance parameters are namely bias, bias stability over time and environmental changes, and noise. The enhanced capacitive sensitivity for the actuator section provides a higher acceleration sensing range. In this way, a higher dynamic range sensor is achieved by maximizing the capacitive sensitivity. The closed loop mode offers better linearity over the full sensing range, in addition to lower vibration rectification effects as well as cross axis sensitivity. The area changing effect also improves the linearity of the measurement and the vibration rectification error.

Figure 5:
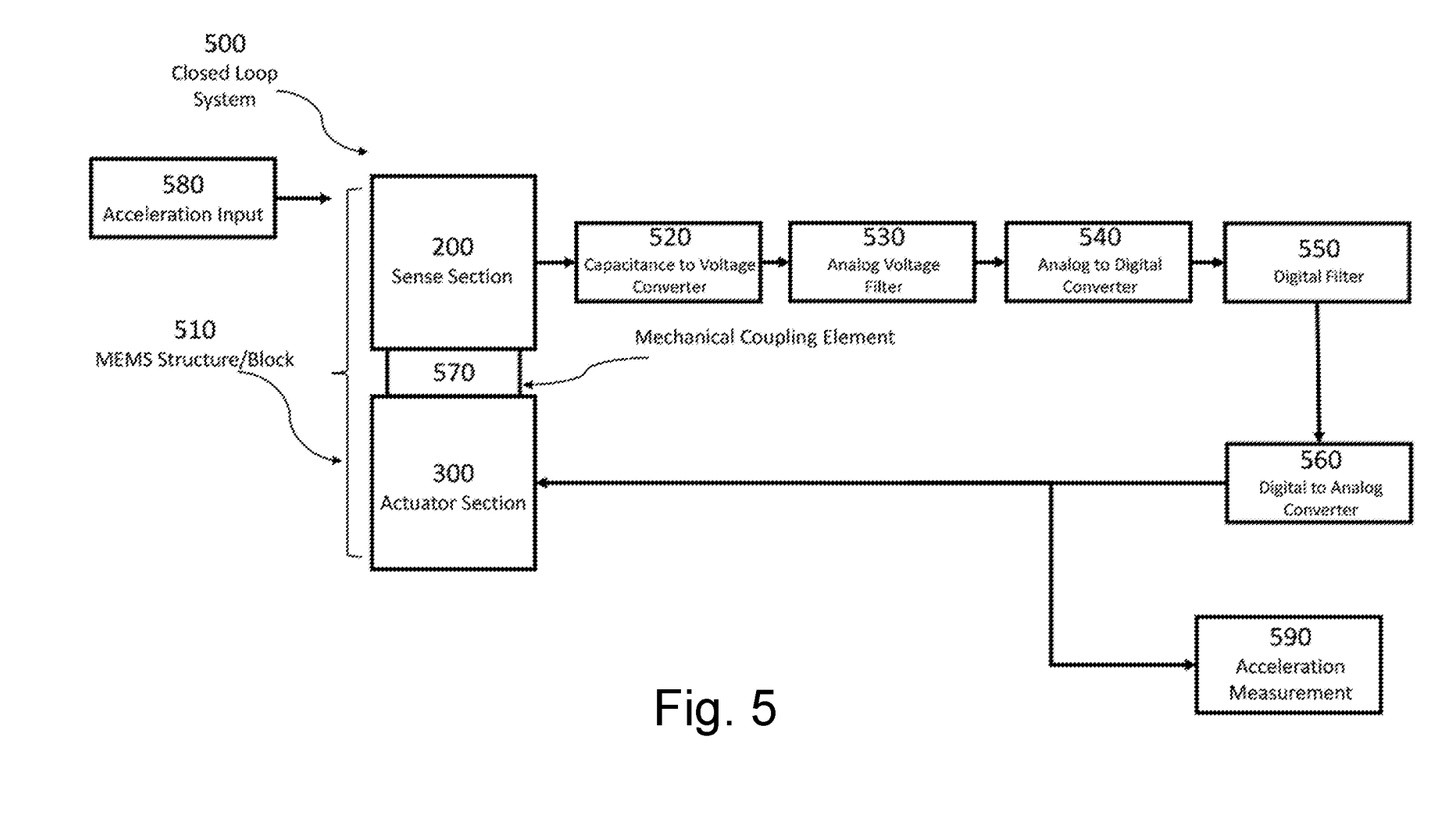
FIG. 5 is a functional block diagram schematically showing an embodiment of the present invention in which a composite structure is a component of a closed loop system.

FIG. 5 is a functional block diagram showing an embodiment of this invention in which a composite structure is a component of a closed loop system 500. The MEMS structure 510 is a composite structure that contains at least one sense structure and at least one actuator structure, as described herein below with respect to the embodiments shown in FIGS. 6, 7, and 8. Each structure is similar to that of FIG. 4 and is based on the concepts described in FIGS. 1A to 1B, 2A, 2B, and 3. However, FIG. 5, being a functional diagram, does not refer specifically to any specific structure or specific arrangement of composite structure and will be described in terms of functional sections and not physical structures.

The MEMS block 510 in this figure has one sense section 200 and one actuator section 300. Sections 200 and 300 are mechanically coupled by section 570 which is by definition a functional mechanical coupling element. Block 580 represents the acceleration input to the measurement system. Block 520 is a capacitance to voltage converter. Section 200 and block 520 together represent the transfer function of FIG. 2B, in which the differential voltage is a function of the displacement. Block 530 is an analog voltage filter. Block 540 is an analog to digital converter. Block 550 is a digital filter and block 560 is a digital to analog converter. Block 590 is the output of the measurement system and hence is the acceleration measurement. A closed loop system consists of the above sections as connected in FIG. 5. This system represents the closed loop mode of an accelerometer. The intent of describing this embodiment is only to show one possible embodiment for closed loop mode and not to limit this invention to this specific embodiment since many features of the closed loop system may be realized in alternate ways that are known in the art.

Figure 6:
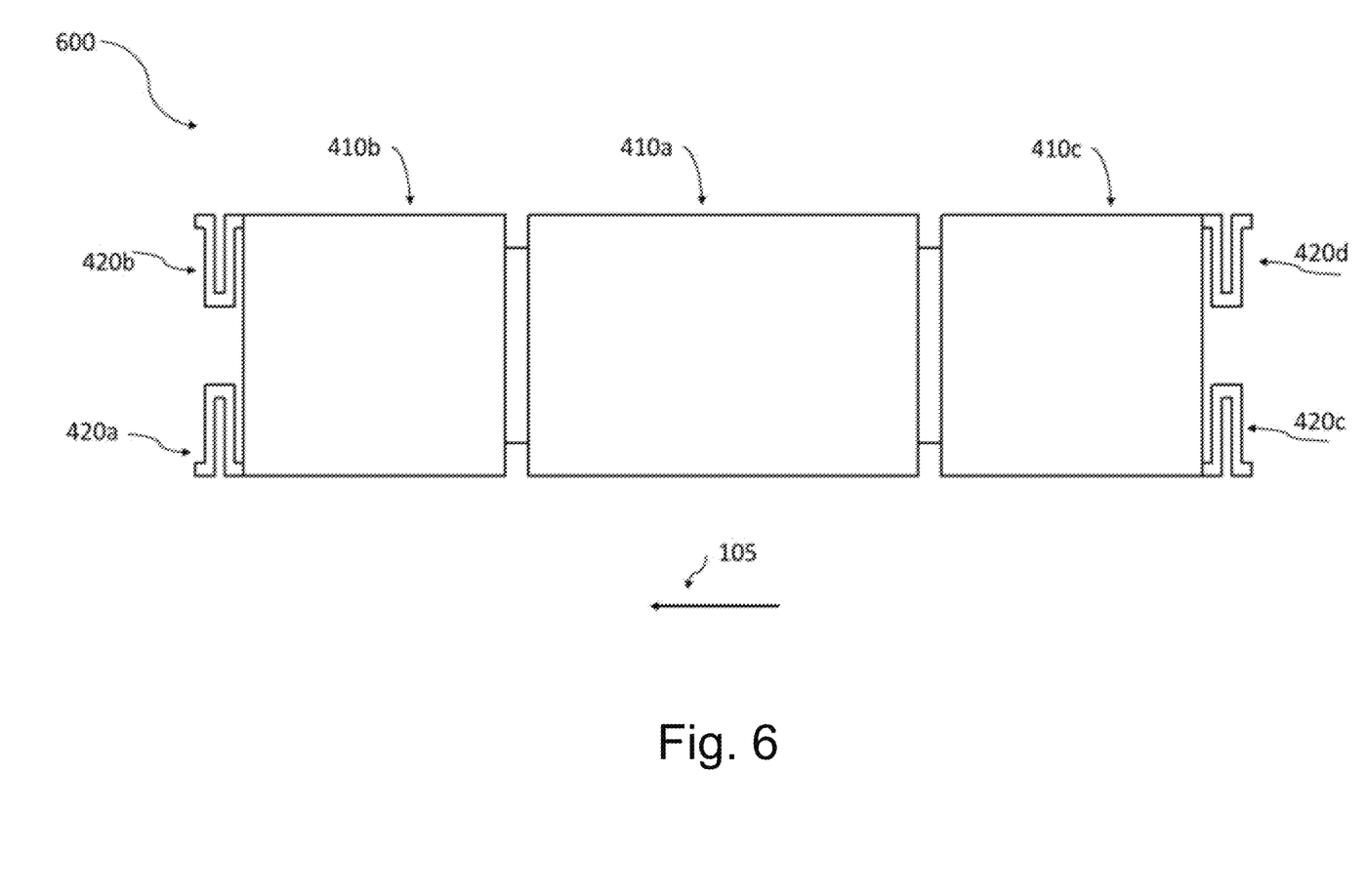
FIGS. 6 and 7 schematically shows different illustrative embodiments of the present invention.

FIG. 6 is a schematic illustration showing an embodiment of this invention in which a composite structure 600 comprises a closed loop accelerometer device. Arrow 105 shows the positive direction of movement of the entire composite structure as permitted by planar springs 420a-420d. Each capacitive section 410a-410c is schematically similar to the capacitive section 410 in FIG. 4. In this embodiment there are three such capacitive sections that are connected mechanically and isolated electrically from each other. For the device to operate in closed loop mode there must be at all times at least one section functioning as a sense section and at least one section functioning as an actuator section. In one illustrative embodiment, the middle section 410a functions as the sense section and the two outer sections, 410c and 410d, function as the drive sections in order to achieve a symmetrical actuator; however this configuration is not essential to the invention. In addition, in this composite structure, it is possible to switch the functionalities of the different sections in a time-multiplexed fashion in order to measure and compensate for non-idealities of the device. In addition, since both sense and drive sections are of a substantially similar mechanical structure, the manufacturing process is easily optimized for the entire structure as a whole. In particular the use of double sided SOI processing techniques can be used. This easily allows the formation of the handle layer as the proof mass below the device capacitor layer. The device capacitor layer can then be used for creating the optimized highly sensitive and linear capacitive structure of FIG. 4 which is used as each of the three sections of FIG. 6. This structure has the advantage of minimizing torque from the actuators.

Figure 7:
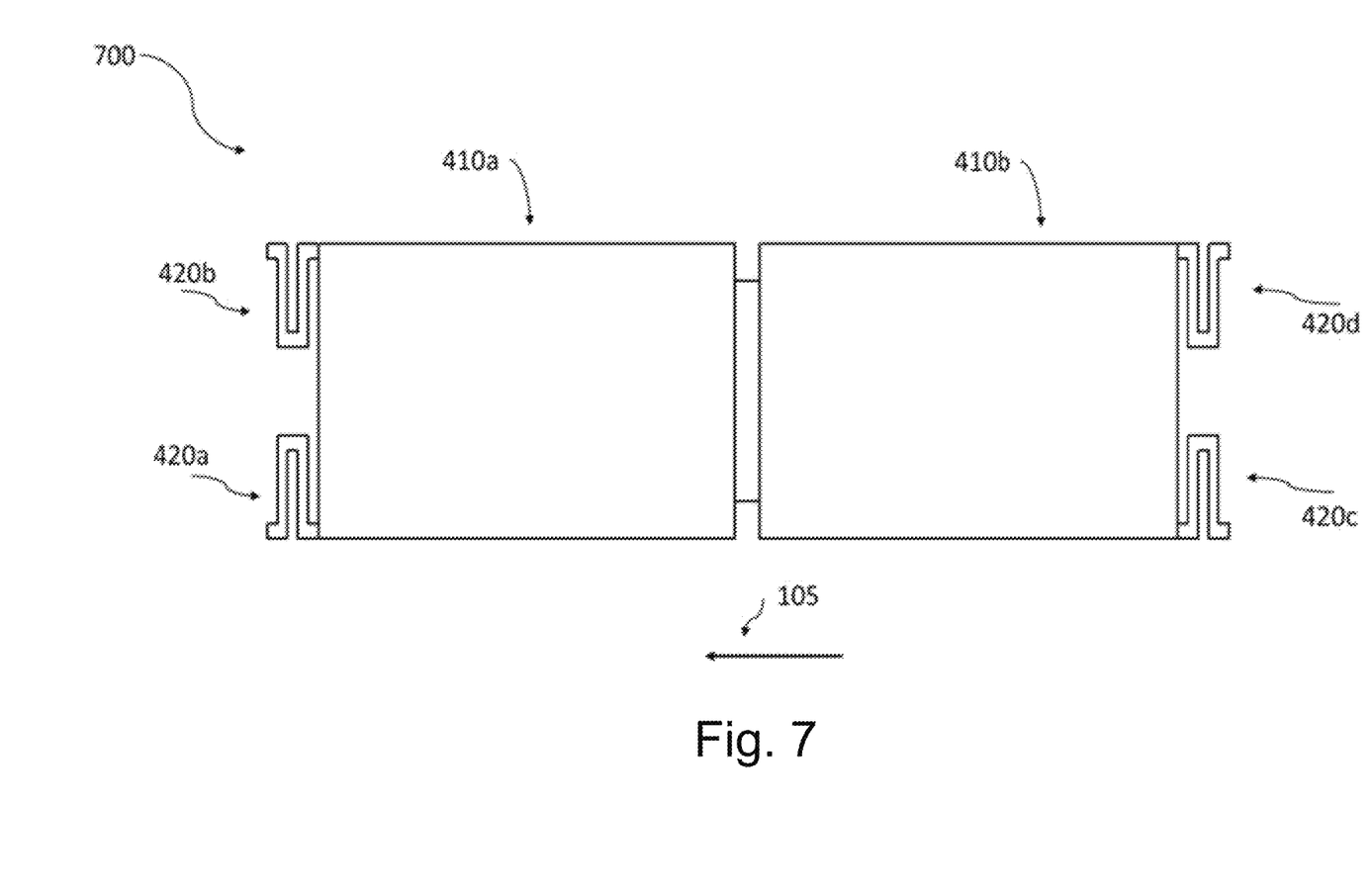

FIG. 7 is a schematic illustration showing an additional embodiment of this invention. Arrow 105 shows the positive direction of movement of the entire composite structure as permitted by planar springs 420a-420d. Each capacitive section 410a-410b is schematically similar to the capacitive section 410 in FIG. 4. In this embodiment there are two such capacitive sections that are connected mechanically and isolated electrically from each other. For the device to operate in closed loop mode there must be at all times at least one section functioning as a sense section and at least one section functioning as an actuator section. In this embodiment, one of the two sections 410a and 410b functions as the sense section and other one functions as the drive section. As in the embodiment described in FIG. 6, in this composite structure of FIG. 7, it is possible to switch the functionalities of the different sections in a time-multiplexed fashion in order to measure and compensate for non-idealities of the device. The other advantages of the embodiment of FIG. 6 are true for this embodiment as well.

Due to the inherent uniformity of the accelerometer structure the accelerometers of the invention can be easily fabricated using standard silicon on insulator (SOI) fabrication techniques generally known in the semiconductor industry. This enhances yield and reduces cost which is a critical feature of this invention. Processing the SOI wafer from two sides, results in increased mass of the suspended proof mass, which facilitates increasing the capacitive sensitivity and decreasing the thermo-dynamical noise.

It is possible to combine at least two accelerometers of the types described herein in a configuration for the simultaneous measurement of acceleration in two or three dimensions, for sensor fusion to improve system performance, or for redundancy.

The reduced minimum detection limit, high sensing range, and maximum bandwidth with a higher sensitivity and linearity of the accelerometers of the invention results in a very high dynamic range of over 130 dB and a bandwidth of over 1000 Hz and allows for a highly accurate measurement over the 130 dB range which yields nonlinearity and cross axis sensitivity of less than 0.05% and vibration rectification error of less than 10 µg/gRMS^2.

Although embodiments of the invention have been described by way of illustration, it will be understood that the invention may be carried out with many variations, modifications, and adaptations, without exceeding the scope of the claims.

The invention claimed is:

1. A closed circuit accelerometer comprised of a composite structure, the composite structure comprising: a plurality of capacitive sections, wherein at least one capacitive section is configured as a sensing structure and at least one capacitive section is configured as an actuator structure, the composite structure additionally comprised of a common proof mass and a single set of springs and manufactured as an in-plane silicon micro-mechanical electrical systems (MEMS) device, wherein the capacitive sections are connected together mechanically and isolated electrically; wherein the accelerometer comprises electronic circuits that provide a full bridge differential capacitive circuit to both the sensing section and the actuator section thereby enabling closed loop operation by using capacitance due to displacement of the common proof mass in the sensing section to determine an electrostatic force that is applied by sending a voltage to the actuator section to nullify the displacement of the common proof mass in the sensing section.

2. The accelerometer of claim 1, wherein the capacitive sections are substantially similar in terms of dimensions for bulk silicon on insulator (SOI) processing.

3. The accelerometer of claim 1, wherein the functions at least one of the at least one capacitive sections configured as a sensing structure and the at least one capacitive sections configured as an actuator structure are interchanged during operation.

4. The accelerometer of claim 1, wherein the capacitive sections comprise:
   a) a planar substrate;
   b) a pair of capacitive plates that extend upwards from and are supported by and are attached to the substrate, wherein the two capacitive plates are electrically isolated from each other and from the substrate, thereby creating first and second electrical nodes; and
   c) four capacitive plates that are suspended above the substrate from a proof mass frame, wherein two of the capacitive plates are electrically shorted, creating a third electrical node, and the other two capacitive plates are electrically shorted, creating a fourth electrical node, and both the third and the fourth electrical nodes are electrically isolated from the proof mass frame.

5. The accelerometer of claim 4, wherein the two capacitive plates attached to the substrate together with the four capacitive plates suspended from the proof mass frame form four capacitors, such that each of the four capacitors is comprised of one of the common proof mass capacitive plates and a part of one of the substrate capacitive plates, and wherein the proof mass frames of all capacitive sections are mechanically connected together to form a single proof mass frame, which, together with the capacitive plates suspended from it, comprises the common proof mass; and wherein the single set of springs supports the common proof mass above the substrate and confines the movement of the single proof mass frame in one dimension such that, as the proof mass frame moves or vibrates above the substrate, the capacitance of the four capacitors changes as a result of area change and gap change features of the capacitors.

6. The accelerometer of claim 1, wherein the capacitive sections comprise:
   a) a planar substrate;
   b) a plurality of capacitive plates that extend bilaterally from a plurality of support arms, which extend upwards from and are supported by and are attached to the substrate; and
   c) a plurality of capacitive plates that extend bilaterally from a plurality of support arms, which are attached to a proof mass frame;
   wherein, the support arms attached to the substrate and the support arms which are attached to the proof mass frame are configured such that their respective attached capacitive plates are disposed centro-symmetrically about the geometric center of the MEMS device and interlaced with each other.

7. The accelerometer of claim 6, wherein the proof mass frames of all capacitive sections are mechanically connected together to form a single proof mass frame, which, together with the capacitive plates suspended from it, comprises the common proof mass; and wherein a set of planar springs, which supports the common proof mass above the substrate and confines the movement of the single proof mass frame in one dimension such that, as the proof mass frame moves or vibrates above the substrate, the capacitance of the capacitors formed from the interlaced capacitor plates changes as a result of area change and gap change features of the capacitors.

8. The accelerometer of claim 1, comprising only three capacitive sections that are mechanically connected to each other and electrically isolated from each other, wherein a common proof mass frame is confined by a single set of springs to move parallel to a plane of a substrate on which the accelerometer is manufactured in one dimension and the capacitive sections function in one of the following ways:
   a) two outer sections function as actuator structures and a middle section functions as a sensing structure;
   b) two outer sections function as sensing structures and a middle section functions as an actuator structure;
   c) a first outer section and a middle section function as actuator structures and a second outer section functions as a sensor structure; and
   d) a first outer section and a middle section function as sensing structures and a second outer section functions as an actuator structure.

9. The accelerometer of claim 8, wherein the actuator and sensing functions of the different capacitive sections are changed in a time-multiplexed fashion in order to measure and compensate for non-idealities of the accelerometer.

10. The accelerometer of claim 1, comprising two capacitive sections that are mechanically connected to each other and electrically isolated from each other, wherein a common proof mass frame is confined by the springs to move parallel to a plane of a substrate in one dimension and the capacitive sections function in one of the following ways:
   a) a first capacitive section functions as an actuator structure and a second capacitive section functions as a sensing structure; and
   b) the first capacitive section functions as a sensing structure and the second capacitive section functions as an actuator structure.

11. The accelerometer of claim 10, wherein the functionalities of the different sections are changed in a time-multiplexed fashion in order to measure and compensate for non-idealities of the accelerometer.

12. An accelerometer comprising a combination of at least two accelerometers of claim 1 configured to enable simultaneous measurement of acceleration in two or three dimensions, or for sensor fusion to improve system performance, or for redundancy.

* * * * *